United States Patent
Ikeda

(10) Patent No.: US 7,527,559 B2
(45) Date of Patent: May 5, 2009

(54) TORQUE TUBE APPARATUS

(75) Inventor: Akihiko Ikeda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 375 days.

(21) Appl. No.: 11/270,498

(22) Filed: Nov. 10, 2005

(65) Prior Publication Data

US 2006/0111216 A1 May 25, 2006

(30) Foreign Application Priority Data

Nov. 24, 2004 (JP) ............................. 2004-339217

(51) Int. Cl.
*F16D 3/84* (2006.01)

(52) U.S. Cl. .................... 464/177; 464/179; 464/182

(58) Field of Classification Search ................ 464/177, 464/182, 183, 170; 403/359.1; 180/337, 180/346, 380, 83, 84

See application file for complete search history.

(56) References Cited

U.S. PATENT DOCUMENTS

| | | | | |
|---|---|---|---|---|
| 2,455,417 A | * | 7/1948 | Bohannon ................. 74/15.6 |
| 2,509,813 A | * | 5/1950 | Dineen ..................... 192/101 |
| 3,568,469 A | * | 3/1971 | Wade et al. ................ 464/160 |
| 4,195,718 A | * | 4/1980 | Schmohe .................. 192/69.2 |
| 4,198,832 A | * | 4/1980 | Pauli ........................ 464/154 |
| 6,398,521 B1 | * | 6/2002 | Yorulmazoglu ............ 417/360 |
| 6,883,604 B2 | * | 4/2005 | Mack et al. ................ 166/105 |

FOREIGN PATENT DOCUMENTS

| | | |
|---|---|---|
| JP | 5-85102 | 4/1993 |
| JP | 2005-112156 | 4/2005 |

* cited by examiner

*Primary Examiner*—Aaron M Dunwoody
(74) *Attorney, Agent, or Firm*—Oblon, Spivak, McClelland, Maier & Neustadt, P.C.

(57) ABSTRACT

A torque tube apparatus includes a tube member that connects a transaxle and a clutch unit to each other, a transaxle-side shaft, a clutch shaft, and a sleeve that has a first end and a second end. The first end is slidable with respect to the transaxle-side shaft. The second end is removeable from the clutch shaft. The tube member has a removable intermediate case. The intermediate case can be removed by separating the second end from the clutch shaft and sliding the first end with respect to the transaxle-side shaft.

19 Claims, 12 Drawing Sheets

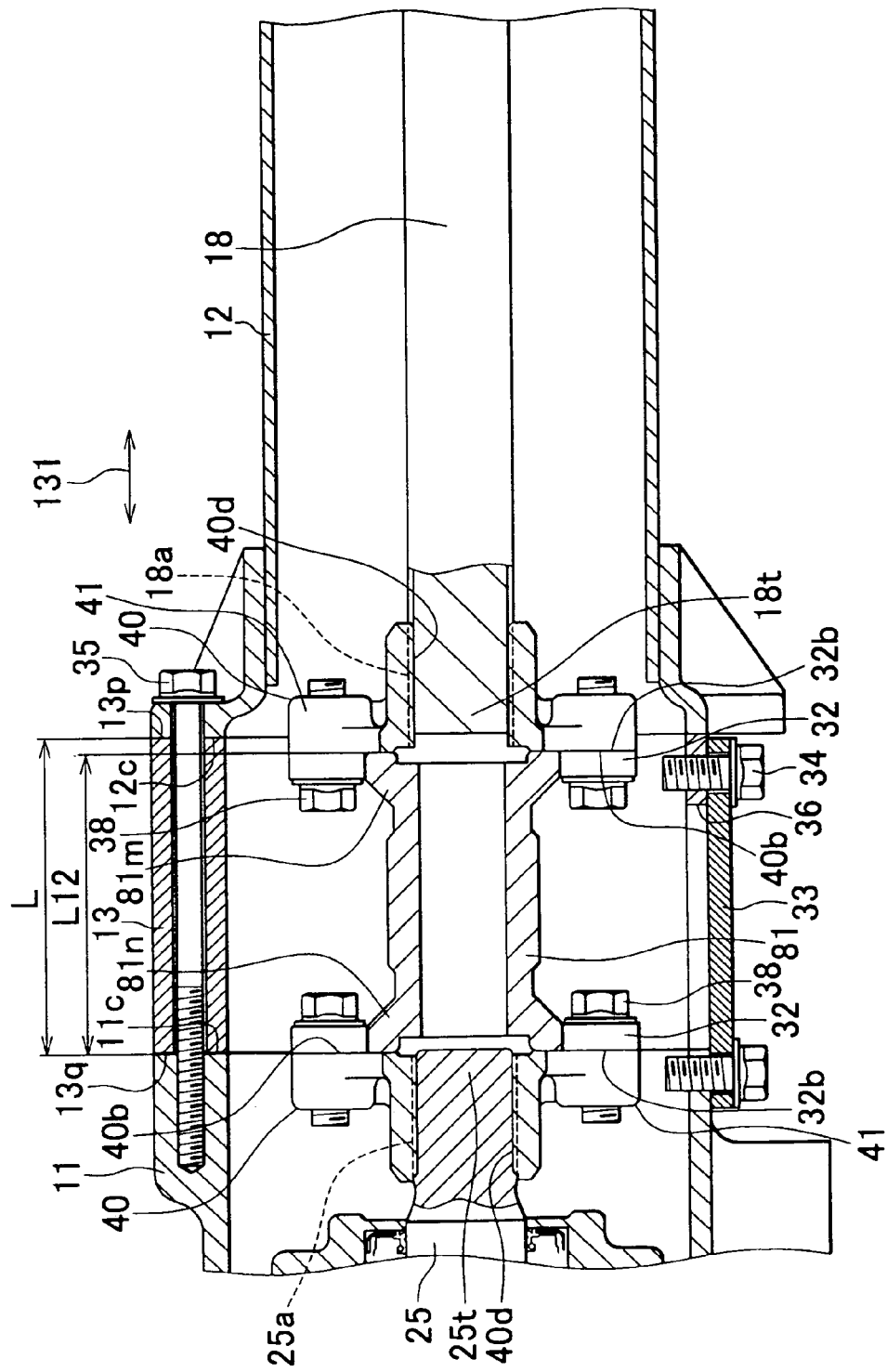

TORQUE TUBE APPARATUS

INCORPORATION BY REFERENCE

The disclosure of Japanese Patent Application No. 2004-339217 filed on Nov. 24, 2004, including the specification, drawings and abstract is incorporated herein by reference in its entirety.

BACKGROUND OF THE INVENTION

1. Field of the Invention

The invention relates generally to a torque tube apparatus, and, more specifically, to a torque tube apparatus that is mounted in a powertrain of a vehicle, and that connects two power transmission devices, provided at a given distance from each other, by using a rigid structure.

2. Description of the Related Art

A conventional type of a torque tube apparatus is disclosed in, for example, Japanese Patent Application Publication No. 05-85102 A. This torque tube apparatus is designed with the aim of facilitating the ease and efficiency of maintenance. The torque tube apparatus disclosed in Japanese Patent Application Publication No. 05-85102 A connects a clutch and a transaxle that are provided at a given distance from each other. The torque tube shaft is provided between a clutch shaft extending from the clutch and a transaxle shaft extending from the transaxle. The torque tube shaft and the clutch shaft are fixed to each other with a bolt via coupling means. Similarly, the toque tube shaft and the transaxle shaft are fixed to each other with a bolt via coupling means.

The clutch and the transaxle are connected to each other by a cylindrical torque tube housing provided around the torque tube shaft. The torque tube housing includes a first tube provided adjacent to the clutch, a second tube provided adjacent to the transaxle, and a third tube provided between the first tube and the second tube. The first tube is removably attached to the clutch with a bolt. Similarly, the second tube is removably attached to the transaxle with a bolt. Each of the first tube and the second tube is movable with respect to the third tube in the axial direction.

With such a structure, when maintenance is performed, first, the first tube is removed from the clutch and the second tube is removed from the transaxle. Then, the first tube and the second tube are moved with respect to the third tube in the axial direction. Next, the clutch shaft and the transaxle shaft are disconnected from the torque tube shaft. Then, the toque tube shaft and the torque tube housing are removed from the position between the clutch and the transaxle. As a result, a space for a technician to perform maintenance on the clutch and the like is obtained.

As described thus far, in the torque tube apparatus disclosed in Japanese Patent Application Publication No. 05-85102 A, the torque tube shaft and the torque tube housing are removable. Accordingly, maintenance on the clutch and the like can be performed without removing the entire powertrain from the vehicle. To remove these shafts and the housing, however, all the bolts used to fix these shafts and the housing need to be loosened and removed, which can be very time consuming. Also, the torque tube housing that extends between the clutch and the transaxle is very heavy, making it difficult to remove the torque tube apparatus. Accordingly, even with the torque tube apparatus disclosed in Japanese Patent Application Publication No. 05-85102 A, the efficiency in performing maintenance is not substantially improved.

SUMMARY OF THE INVENTION

It is an object of the invention to solve the above-mentioned problem, and to provide a torque tube apparatus with which the efficiency in performing maintenance on a powertrain can be improved.

A torque tube apparatus according to an aspect of the invention includes a first power transmission device and a second power transmission device that are provided at a given distance from each other; a tube member that connects the first power transmission device and the second power transmission device to each other; a first shaft that extends from the first power transmission device and that has a first end portion at an end on an extension side; a second shaft that extends from the second power transmission device and that has a second end portion at an end on an extension side, the second end portion being positioned at a given distance from the first end portion; and an intermediate shaft having a first end and a second end. The first end of the intermediate shaft is connected to the first end portion, and slidable with respect to the first shaft in the axial direction. The second end is connected to the second end portion, and is removable from the second shaft. The tube member has a removable intermediate shaft case that surrounds the intermediate shaft. The intermediate shaft case can be removed by removing the second end from the second shaft and sliding the first end along the first shaft toward the first power transmission device.

With the thus configured torque tube apparatus, space for a technician to perform maintenance on the first and the second power transmission devices can be obtained by removing the intermediate shaft case without removing the entire first and second power transmission devices. Because the first end of the intermediate shaft is slidable with respect to the first shaft, the intermediate shaft can be retracted to a position at which the intermediate shaft does not interfere with the removal of the intermediate shaft case, by just separating the second end of the intermediate shaft from the second shaft. As a result, the intermediate shaft case can be removed more easily. Therefore, the efficiency in performing maintenance on the first and the second power transmission devices can be improved.

A torque tube apparatus according to another aspect of the invention includes a first power transmission device and a second power transmission device that are provided at a given distance from each other; a tube member that connects the first power transmission device and the second power transmission device to each other; a first shaft that extends from the first power transmission device and that has a first end portion at an end on an extension side; a second shaft that extends from the second power transmission device and that has a second end portion at an end on an extension side, the second end portion being positioned at a given distance from the first end portion; and an intermediate shaft that is connected to the first end portion and the second end portion, and that is removable from the first shaft and the second shaft. The tube member includes a main body case that extends from at least one of the first power transmission device and the second power transmission device; and an intermediate shaft case that surrounds the intermediate shaft, and that is removable from the main body case. The intermediate shaft case can be removed from the main body case by separating the intermediate shaft from the first shaft and the second shaft.

With the thus configured torque tube apparatus, space for a technician to perform maintenance on the first and the second power transmission devices can be obtained by removing the intermediate shaft case without removing the entire first and second power transmission devices. Because the intermediate shaft case is removable from the main body case, only the intermediate shaft case needs to be removed while the main body case remains on at least one of first power transmission device and the second power transmission device. Therefore, the efficiency in performing maintenance on the first and the second power transmission devices can improved, as compared to the case where the entire tube member needs to be removed.

As described thus far, the invention provides for a torque tube apparatus in which the efficiency in performing maintenance on the powertrain is improved.

BRIEF DESCRIPTION OF THE DRAWINGS

The features, advantages thereof, and technical and industrial significance of this invention will be better understood by reading the following detailed description of the exemplary embodiments of the invention, when considered in connection with the accompanying drawings, in which:

FIG. 13 illustrates a cross sectional view of a torque tube apparatus according to a third embodiment of the invention.

DETAILED DESCRIPTION OF THE EXEMPLARY EMBODIMENTS

In the following description and the accompanying drawings, the present invention will be described in more detail with reference to exemplary embodiments.

Figure 1:
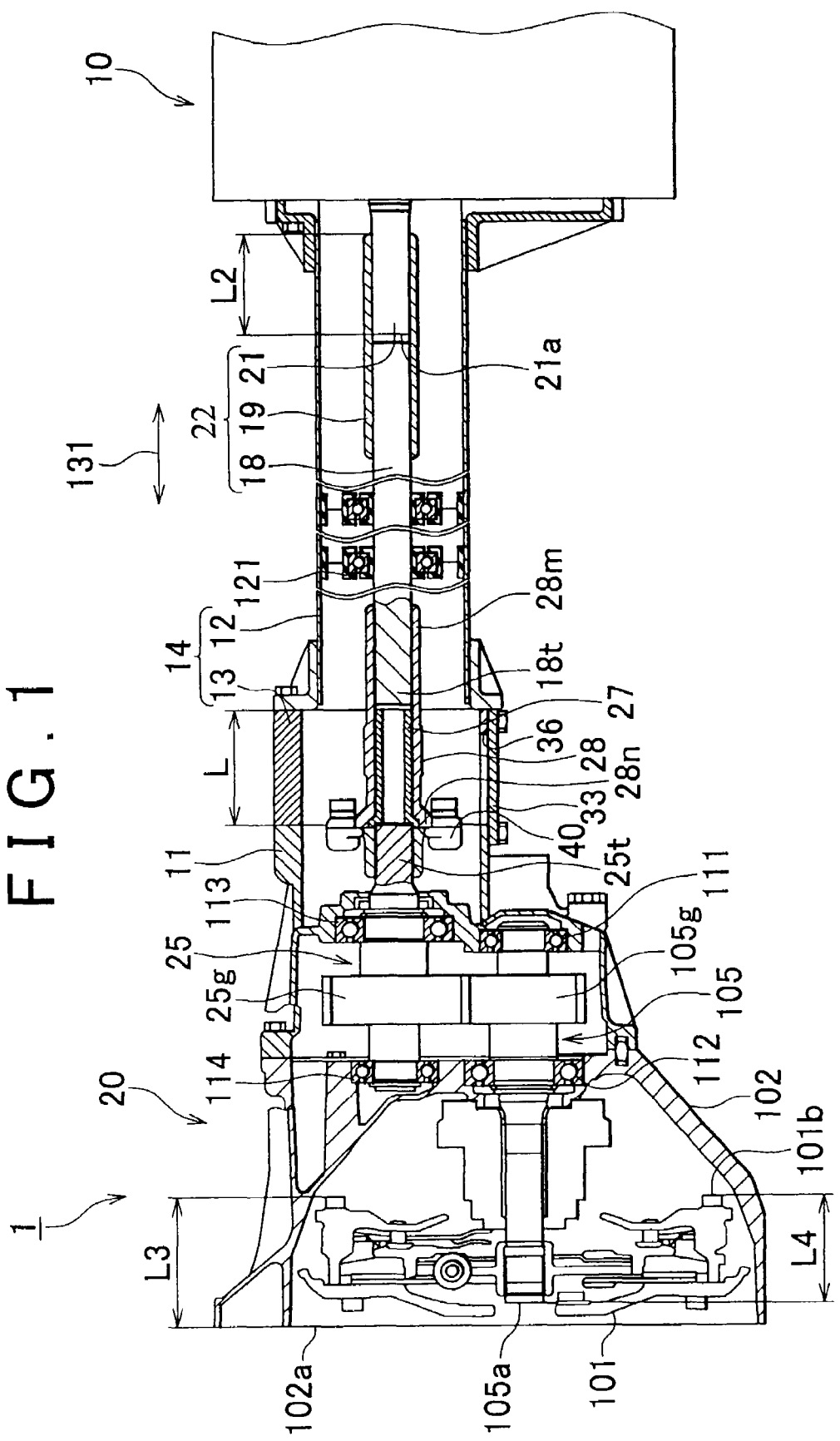
FIG. 1 illustrates a cross sectional view of a powertrain including a torque tube apparatus according to a first embodiment of the invention.

First, a first embodiment will be described in detail. FIG. 1 illustrates a cross sectional view of a powertrain including a torque tube apparatus according to the first embodiment. A powertrain 1 shown in FIG. 1 constitutes a power transmission system of a vehicle. As shown in FIG. 1, the torque tube apparatus includes a clutch unit 20 provided on the side of an engine, namely, on the front side of the vehicle; a transaxle 10 that transmits power to drive wheels provided on the rear side of the vehicle; and a tube member 14 that connects the clutch unit 20 and the transaxle 10 to each other.

The clutch unit 20 includes a clutch 101, an output shaft 105, and a clutch shaft 25. The clutch 101 includes a flywheel, a clutch disc, a pressure plate, and the like. The output shaft 105 is fitted in the clutch disc included in the clutch 101, and is rotatably supported by bearings 111 and 112. The clutch shaft 25 is provided in parallel with the output shaft 105, and is rotatably supported by bearings 113 and 114.

The output shaft 105 and the clutch shaft 25 extend in the direction of an arrow 131, that is, in the longitudinal direction of the vehicle. The output shaft 105 is provided with a drive gear 105g, and the clutch shaft 25 is provided with a driven gear 25g. The drive gear 105g and the driven gear 25g are meshed with each other. The power output from the engine is transmitted from the clutch 101 to the clutch shaft 25 via the output shaft 105.

The clutch unit 20 is housed in a clutch housing 102 and a front-side case 11. The front-side case 11 is attached to the clutch housing 102, and opens toward the rear side of the vehicle. The clutch housing 102 is attached to an engine cover (not shown), and has an attachment surface 102a contacting the engine cover. The clutch shaft 25 is provided in the front-side case 11. The clutch shaft 25 has an end portion 25t at the end on an extension side. The output shaft 105 extends from the inside of the clutch housing 102 to the inside of the front-side case 11. The output shaft 105 is fitted in the clutch 101 in the clutch housing 102, and has an end surface 105a at the end on an extension side.

The transaxle 10 is provided at a given distance from the clutch unit 20. An input shaft 21, through which power is input in a transmission provided in the transaxle 10, extends from the transaxle 10 toward the front side of the vehicle. The input shaft 21 has an end surface 21a at the end on the extension side. The input shaft 21 is connected to a torque tube shaft 18 by a tansaxle-side sleeve 19. The toque tube shaft 18 extends toward the end portion 25t of the clutch shaft 25, and has an end portion 18t at the end on the extension side, at a given distance from the end portion 25t.

A spline is formed in the outer surface of each of the input shaft 21 and the torque tube shaft 18 at a portion at which the input shaft 21 and the toque tube shaft 18 contact each other. A spline is formed also in the inner surface of the transaxle-side sleeve 19. The input shaft 21 and the toque tube shaft 18 are fitted into the transaxle-side sleeve 19 from the opposite sides, whereby the input shaft 21 and the torque tube shaft 18 are connected to each other. The input shaft 21, the transaxle-side sleeve 19, and the torque tube shaft 18 constitute a transaxle-side shaft 22 having the end portion 18t.

In the first embodiment, the input shaft 21 and the transaxle-side sleeve 19 are loosely splined to each other (the spline formed in the input shaft 21 and the spline formed in the transaxle-side sleeve 19 are loosely engaged with each other), and the torque tube shaft 18 and the transaxle-side sleeve 19 are tightly splined to each other (the spline formed in the toque tube shaft 18 and the spline formed in the transaxle-side sleeve 19 are tightly engaged with each other). Alternatively, the input shaft 21 and the transaxle-side sleeve 19 may be tightly splined to each other, and the torque tube shaft 18 and the transaxle-side sleeve 19 may be loosely splied to each other.

A torque tube 12 is fixed to the transaxle 10. The toque tube 12 has a cylindrical shape, and provided around the input shaft 21, the transaxle-side sleeve 19, and the torque tube shaft 18. The toque tube 12 extends from the transaxle 10 toward the front side of the vehicle, where the clutch unit 20 is provided. Support bearings 121 are provided in the torque tube 12 at a plurality of positions along the axial direction. An inner race of the support bearing 121 is tightly fitted around the outer surface of the torque tube shaft 18 via a rubber member, and an outer race of the support bearing 121 is tightly fitted to the inner surface of the torque tube 12 via a rubber member. With such a structure, the torque tube shaft 18 is supported by the support bearings 121 so as to be rotatable in the torque tube 12.

Figure 2:
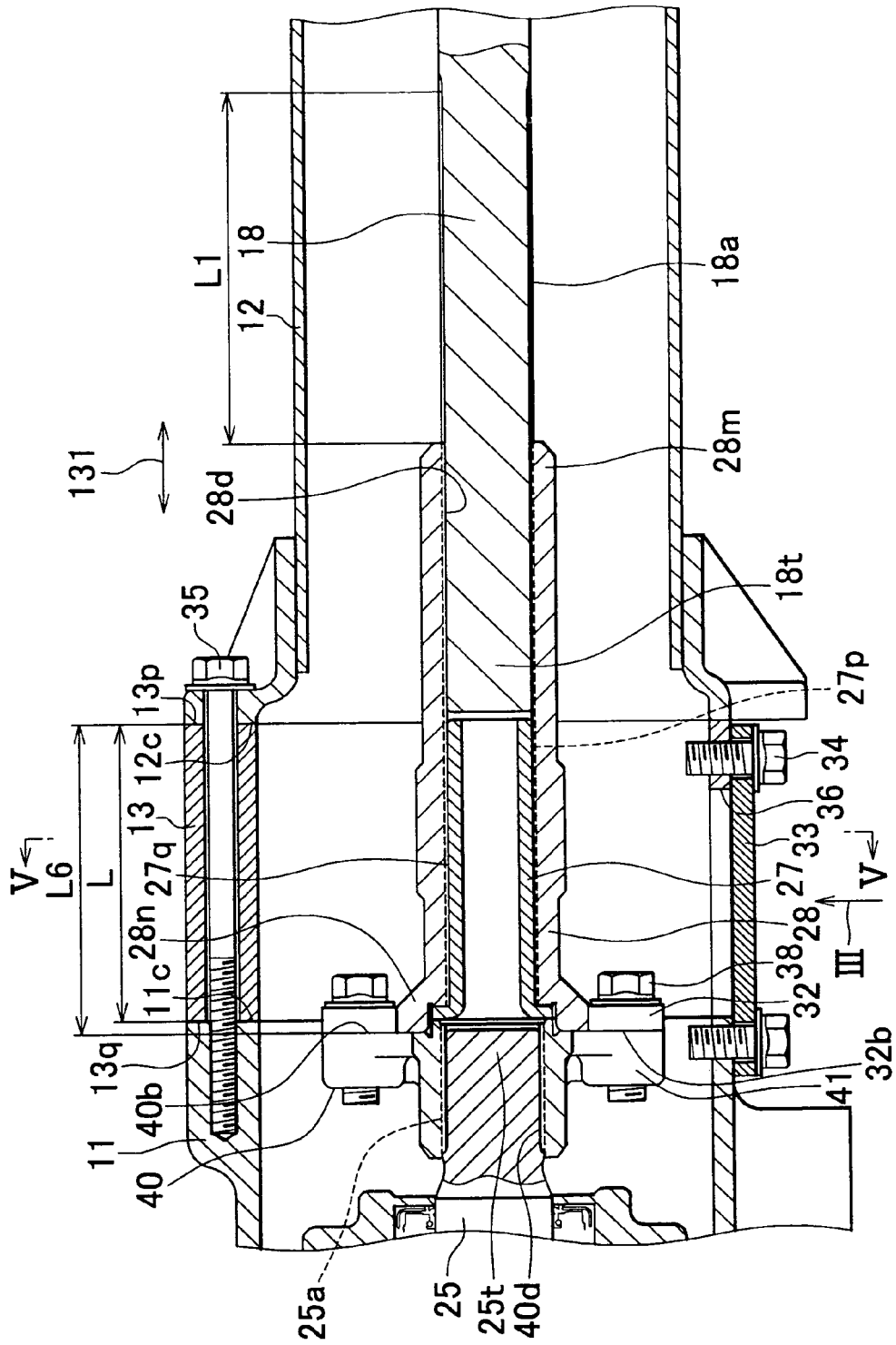
FIG. 2 illustrates an enlarged cross sectional view of a portion at which a clutch shaft and a torque tube shaft in FIG. 1 are connected to each other.

FIG. 2 illustrates an enlarged cross sectional view of a portion at which the clutch shaft 25 and the torque tube shaft 18 in FIG. 1 are connected to each other. As shown in FIGS. 1 and 2, a sleeve 28 having a first end 28m and a second end 28n is provided between the end portion 18t and the end portion 25t. The sleeve 28 has a cylindrical shape, and extends from the first end 28m toward the second end 28n. A spline is formed in an inner surface 28d. A collar portion 32 protruding in the radial direction is provided at the second end 28n. The collar portion 32 has an end surface 32b facing the clutch unit 20.

The end portion 25t of the clutch shaft 25 is provided with a flange 40. The flange 40 has a cylindrical shape. A spline is formed in an inner surface 40d of the flange 40. A collar portion 42 protruding in the radial direction is provided at an end portion of the flange 40. The collar portion 41 has an end surface 40b facing and contacting the end portion 32b. Also, a spline is formed in an outer surface 25a of the end portion 25t of the clutch shaft 25. The flange 40 is fitted to the end portion 25t, whereby the clutch shaft 25 and the flange 40 are tightly splined to each other.

A spline is formed in an outer surface 18a of the end portion 18t of the torque tube shaft 18. The end portion 18t is fitted in the sleeve 28 from the first end 28m, whereby the toque tube shaft 18 and the sleeve 28 are loosely splined to each other. Also, the collar portion 32 and the collar portion 41 are fastened to each other with bolts 38, whereby the clutch shaft 25 and the sleeve 28 are connected to each other via the flange 40 (hereinafter, this connection via the flange 40 may be referred to as the "flange connection").

With such a structure, connection between the clutch shaft 25 and the torque tube shaft 18 is provided by the sleeve 28. As a result, the power transmitted from the engine to the clutch shaft 25 of the clutch unit 20 is further transmitted to the transaxle 10 through the toque tube shaft 18. When connection between the flange 40 and the sleeve 28 is terminated, the first end 28m of the sleeve 28 can slide with respect to the end portion 18t of the torque tube shaft 18 in the direction of the arrow 131.

A cylindrical shaft stopper 27 extending from the end portion 18t toward the end portion 25t is provided between the end portion 18t and the end portion 25t. A spline is formed in an outer surface 27p of the shaft stopper 27, which is close to the end portion 18t. The shaft stopper 27 is inserted into the sleeve 28, whereby the outer surface 27p and the inner surface 28d of the sleeve 28 are splined to each other. A spline is not formed in an outer surface 27q, which is close to the end portion 25t. The shaft stopper 27 is inserted into the sleeve 28, whereby the outer surface 27q is supported by the inner wall of the inner surface 28d of the sleeve 28.

The shaft stopper 27 prevents the torque tube shaft 18 and the flange 40 from inappropriately moving in the direction of the arrow 131.

The torque tube apparatus 12 has an end surface 12c, and the front-side case 11 has an end surface 11c. The end surface 12c and the end surface 11c face toward each other and are separated by a given distance. An intermediate case 13 is provided between the torque tube 12 and the front-side case 11 so as to surround the sleeve 28. The intermediate case 13 has an end surface 13p contacting the end surface 12c, and an end surface 13q contacting the end surface 11c. The intermediate case 13 is fastened, together with the toque tube 12, to the front-side case 11 with a bolt 35. Thus, the intermediate case 13 is fixed at a position between the torque tube 12 and the front-side case 11.

The toque tube 12 and the intermediate case 13 constitute the tube member 14. The tube member 14 connects the clutch unit 20 provided on the front side of the vehicle and the transaxle 10 provided on the rear side of the vehicle to each other by using a rigid structure.

Figure 3:
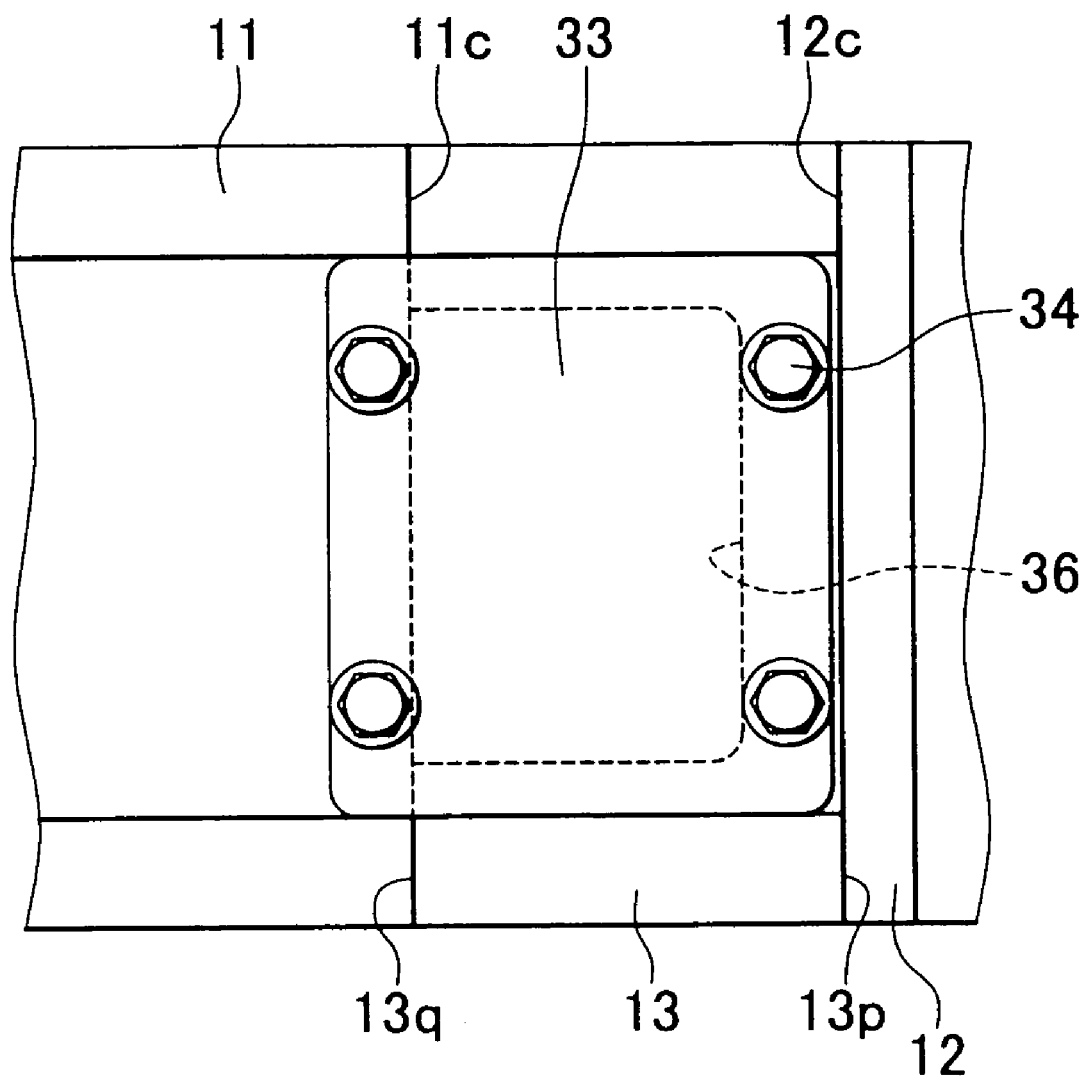
FIG. 3 illustrates a bottom plan view of the torque tube apparatus viewed from the direction of an arrow III in FIG. 2.

FIG. 3 illustrates a bottom plan view of the torque tube apparatus viewed from the direction of an arrow III in FIG. 2. As shown in FIG. 3, an access opening 36, which faces downward in the vertical direction, is formed in the bottom surface of the intermediate case 13. The access opening 36 is covered by a maintenance lid 33. Maintenance lid 33 is fixed to the intermediate case 13 and the front-side case 11 with bolts 34.

Figure 4:
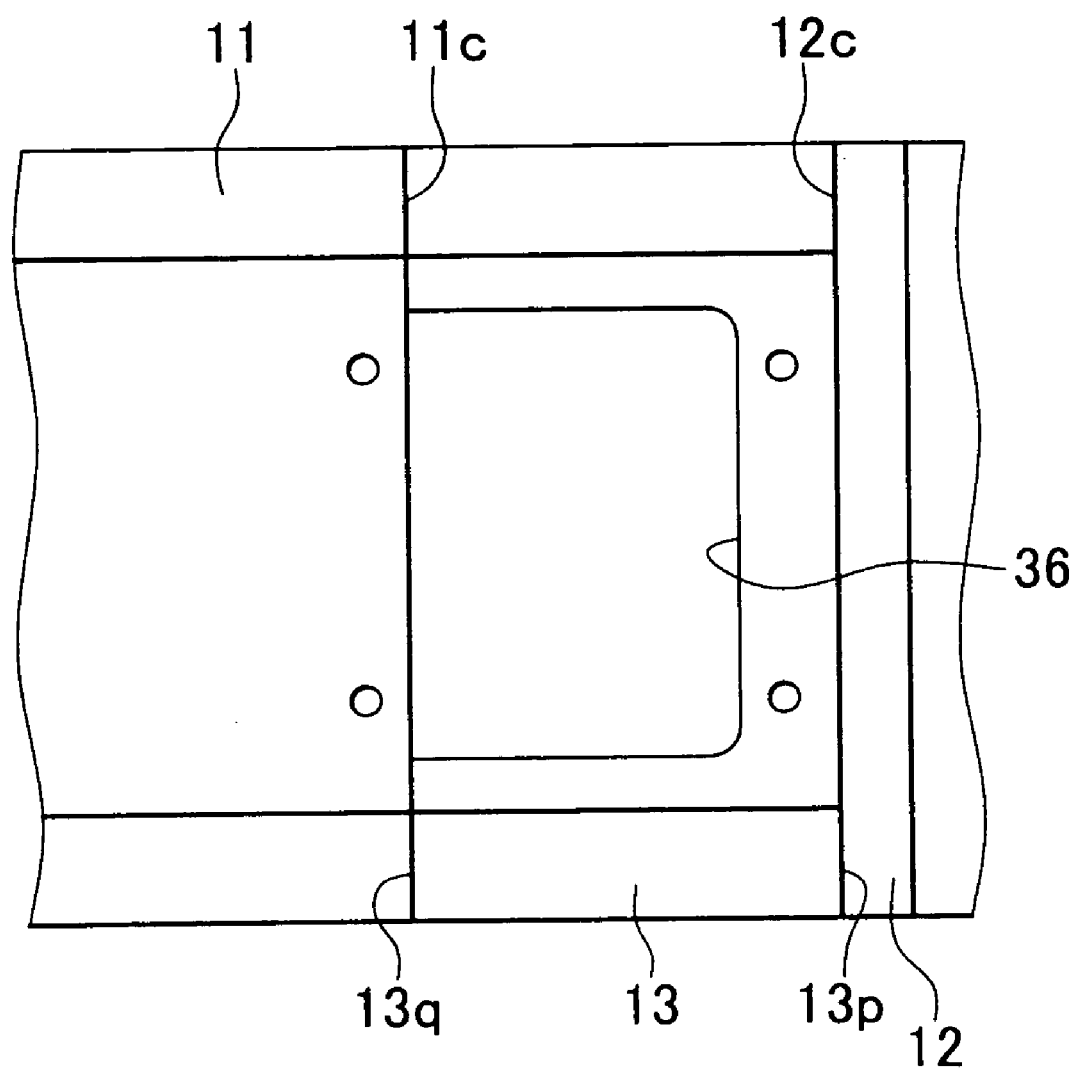
FIG. 4 illustrates a bottom plan view of the torque tube apparatus during a first step of the maintenance procedure.
Figure 5:
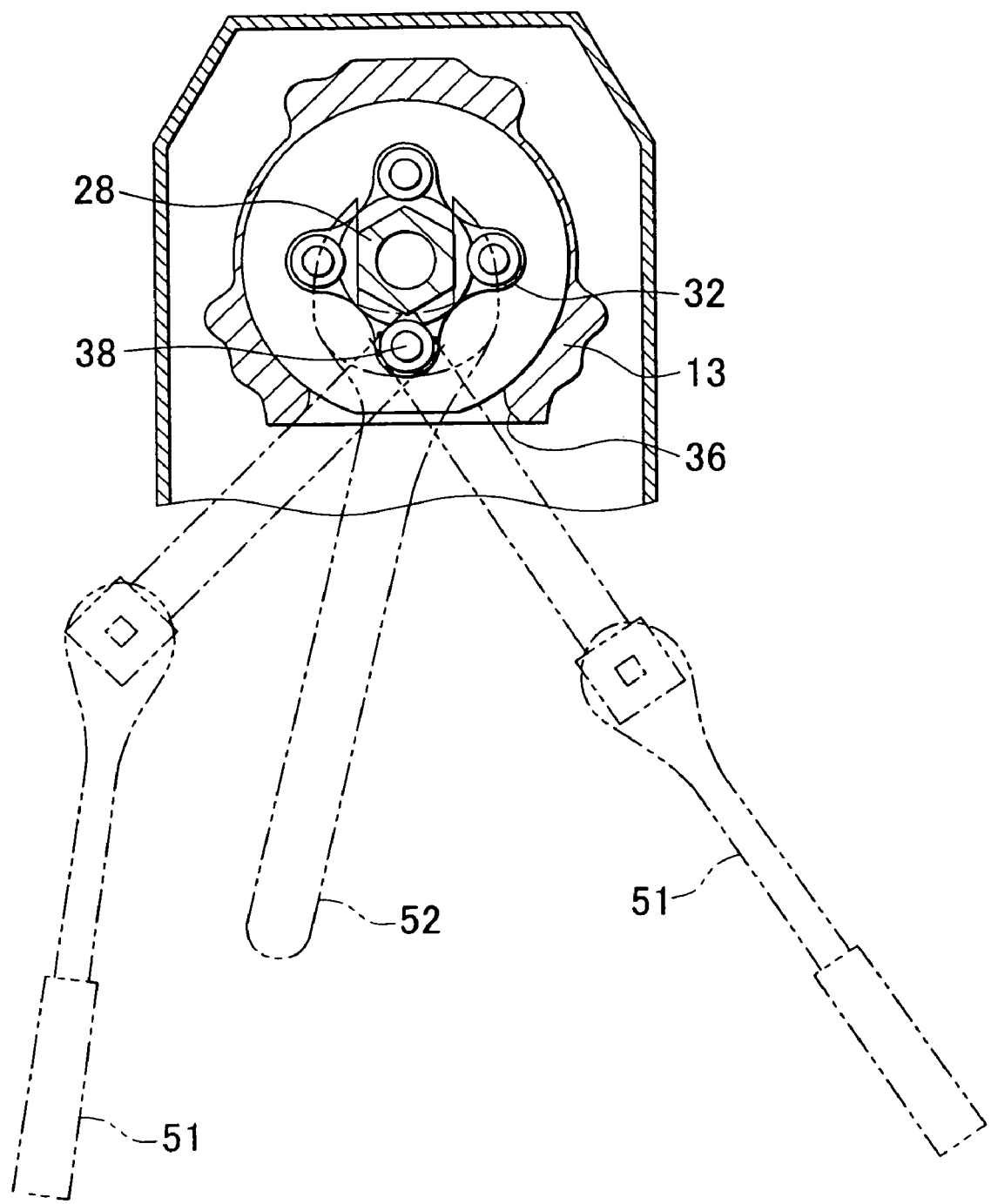
FIG. 5 illustrates a cross sectional view of the torque tube apparatus during a second step of the maintenance procedure.

Next, procedures for performing maintenance on the powertrain in FIG. 1 will be described in detail. FIG. 4 illustrates a bottom plan view of the torque tube apparatus during a first step of the maintenance procedure. The region shown in FIG. 4 is the same as that shown in FIG. 3. FIG. 5 illustrates a cross sectional view of the torque tube apparatus during a second step of the maintenance procedure. FIG. 5 illustrates the cross sectional view taken along line V-V in FIG. 2.

As shown in FIGS. 4 and 5, maintenance lid 33 is removed from the intermediate case 13 and the front-side case 11 by loosening the bolts 34. A spanner 52 and a ratchet 51 are inserted from the exposed access opening 36. The bolts 38 are loosened using the ratchet 51 while the sleeve 28 and the flange 40 are prevented from turning by supporting the sleeve 28 with the spanner 52.

Figure 6:
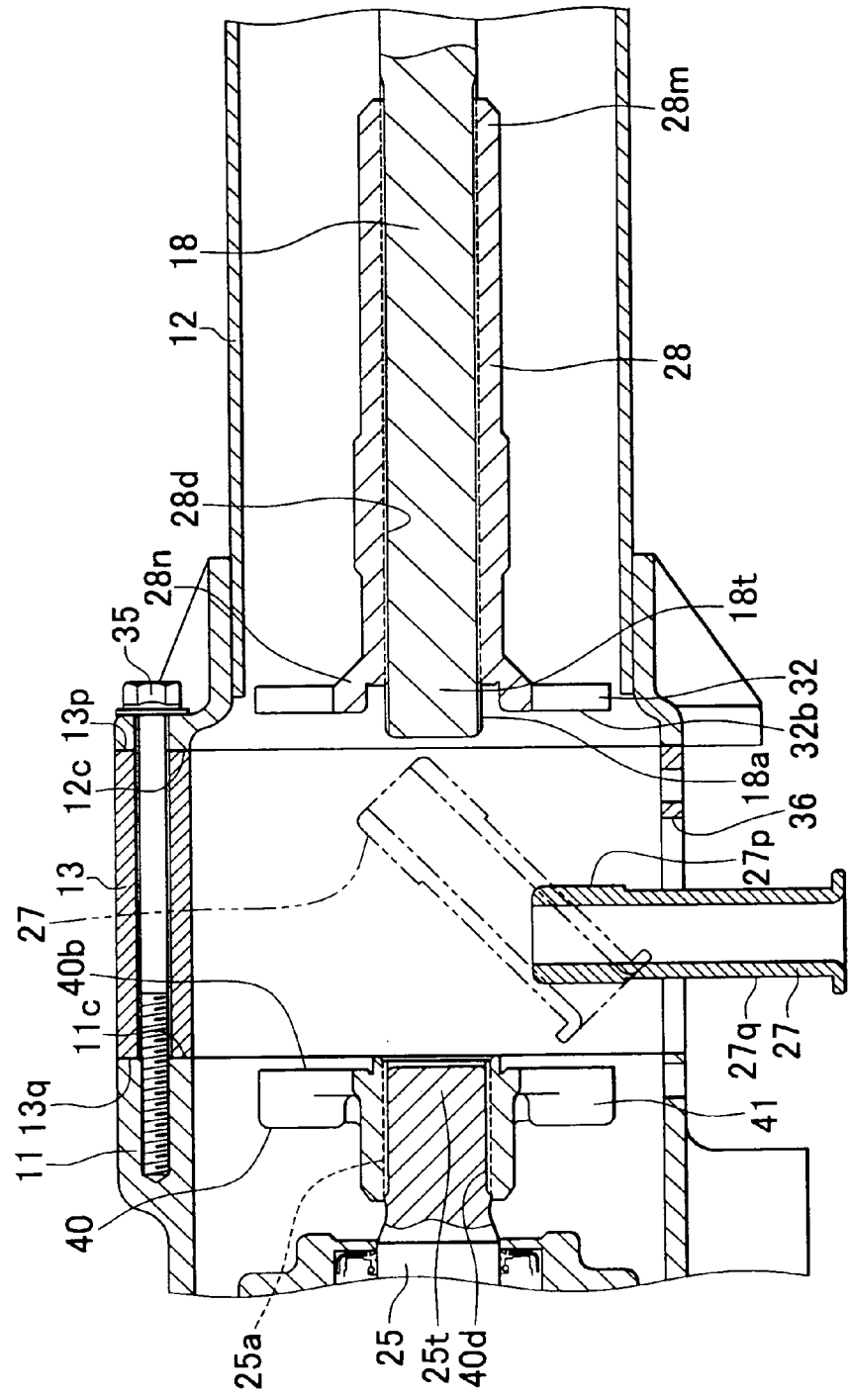
FIG. 6 illustrates a cross sectional view of the torque tube apparatus during a third step of the maintenance procedure.
Figure 7:
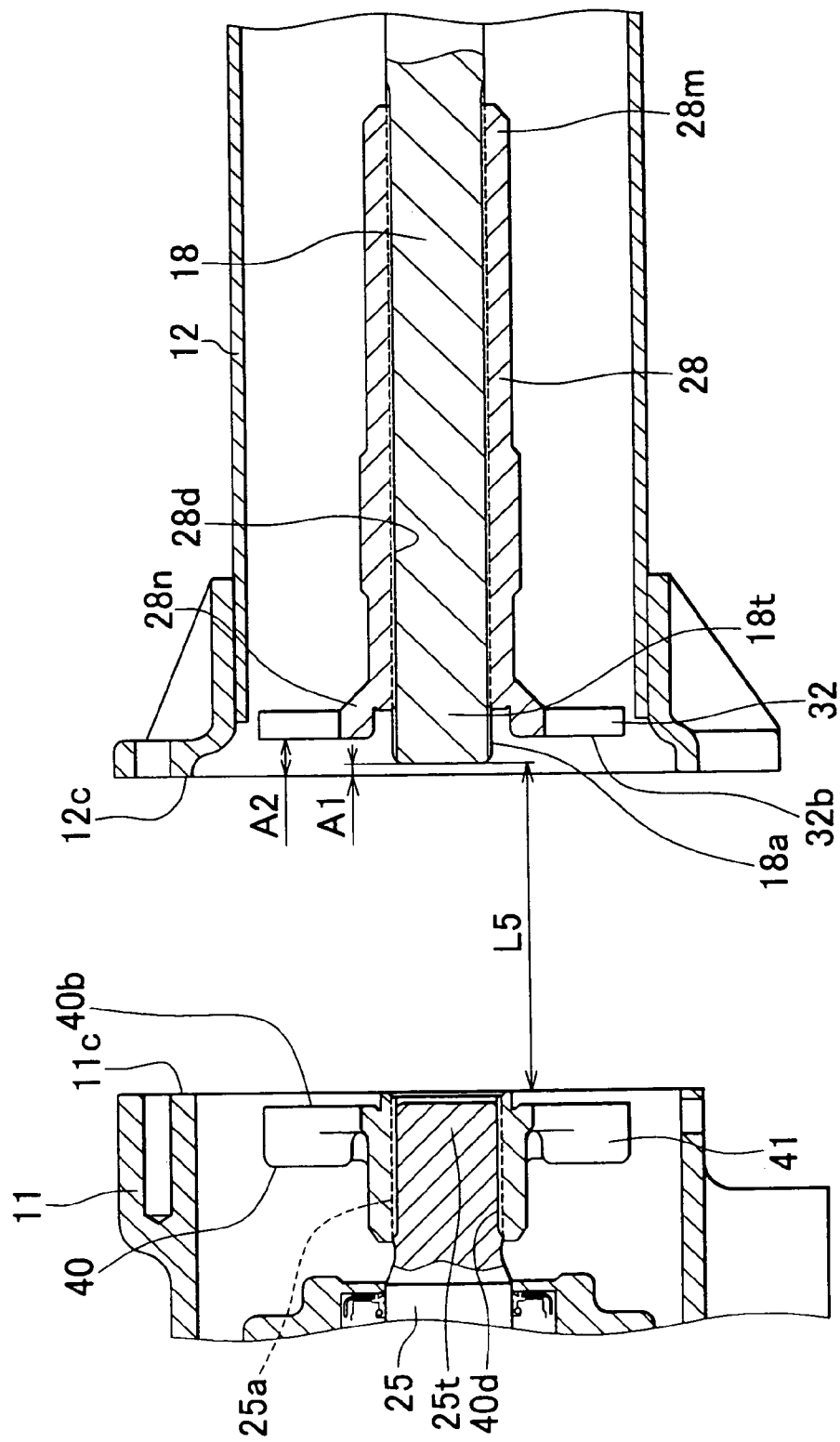
FIG. 7 illustrates a cross sectional view of the torque tube apparatus during a fourth step of the maintenance procedure.

FIG. 6 illustrates a cross sectional view of the torque tube apparatus during a third step of the maintenance procedure, and FIG. 7 illustrates a cross sectional view of the torque tube apparatus during a fourth step of the maintenance procedure. The region shown in each of FIGS. 6 and 7 is the same as that shown in FIG. 2. As shown in FIG. 6, the sleeve 28 is separated from the flange 40 by loosening the bolts 38. The sleeve 28 is slid with respect to the end portion 18t so as to move toward the transaxle 10 in FIG. 1. As the sleeve 28 moves, the shaft stopper 27 is removed out of the sleeve 28 by the end portion 18t. The shaft stopper 27 is removed from the access opening 36. The removal of the sleeve 28 in this step disconnects the torque tube shaft 18 from the clutch shaft 25.

As shown in FIG. 7, the bolt 35 is loosened, and the intermediate case 13 is take out from the position between the torque tube 12 and the front-side case 11. By this time, the sleeve needs to be moved to the position at which the end surface 32b of the sleeve 28 does not protrude from the end surface 12c of the torque tube 12 such that the intermediate case 13 can be removed (that is, a distance A2 in FIG. 7 needs to be longer than "0"). Namely, if the distance for which the sleeve 28 can slide is L1, and the distance from the end surface 12c to the end surface 32b is L6 in the state shown in FIG. 2, the distance L1 needs to be longer than the distance L6 (L1>L6).

If the distance between the flange 40 and the torque tube shaft 18 is L5, and the length of the intermediate case 13 is L, the distance L5 needs to be longer than the length L. In the first embodiment, the torque tube shaft 18 is provided such that the end surface of the torque tube shaft 18 does not protrude from the end surface 12c of the torque tube 12 (that is, a distance A1 in FIG. 7 needs to be longer than "0"). Also, the flange 40 is provided such that the end surface of the inner peripheral portion of the flange 40 and the end surface 11c of the front-side case 11 are on the same flat surface.

As shown in FIG. 1 and FIG. 7, removal of the intermediate case 13 forms a space for maintenance having the length L is formed between the torque tube 12 and the front-side case 11. When maintenance on the clutch unit 20 is performed, for example, the bolt fastening the clutch housing 102 and the engine cover (not shown) to each other is loosened. Then, the clutch unit 20 together with the clutch housing 102 is slid toward the transaxle 10 by using the space for maintenance, and the clutch unit 20 is separated from the powertrain 1. Since the clutch 101 is left on the engine side, the length L of the space for maintenance needs to be longer than a distance L3 from the attachment surface 102a of the clutch housing 102 to the far rear end of the clutch 101 (L>L3). Also, since the output shaft 105 is fitted in the clutch 101, the length L of the space for maintenance needs to be longer than a distance L4 from the end surface 105a of the output shaft 105 to the far rear end of the clutch 101 (L>L4).

When maintenance on the transaxle 10 and the torque tube 18 is performed, the bolt used for fastening the torque tube 12 and the transaxle 10 to each other is loosened. Then, the toque tube shaft 18 and the torque tube 12 are moved toward the clutch unit 20 by using the space for maintenance so as to be separated from the transaxle 10. At this time, the transaxle-side sleeve 19 tightly splined to the torque tube shaft 18, together with the torque tube shaft 18, is removed. The input shaft 21 loosely splined to the transaxle-side sleeve 19 is left on the transaxle 10 side. Accordingly, the length L of the space for maintenance needs to be longer than a distance L2 from the end surface 21a of the input shaft 21 to the far rear end of the transaxle-side sleeve 19 (L>L2).

In the first embodiment, since the intermediate case 13 is provided adjacent to the clutch unit 20, the distance between the clutch unit 20 and the intermediate case 13 is shorter than the distance between the transaxle 10 and the intermediate case 13. Maintenance on the clutch unit 20 is performed more frequently than maintenance on the other components constituting the powertrain. Accordingly, the first embodiment produces an effect of reducing the size of the components removed from the powertrain 1 when maintenance on the clutch unit 20 is performed. As a result, maintenance on the clutch unit 20 can be performed more easily.

Also, providing the intermediate case 13 adjacent to the clutch unit 20 makes it possible to set the size of the cross section of the intermediate case 13 to a small value. Namely, it is preferable to provide the intermediate case 13 at a position at which the size of the cross section of the tube member is small. As a result, the intermediate case 13 having a small size can be provided without increasing a change in the cross sectional area of the tube member.

Figure 8:
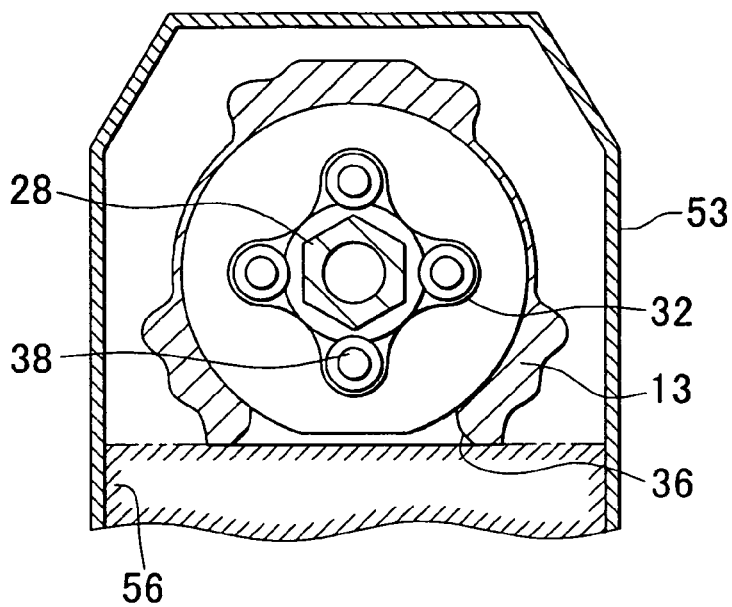
FIG. 8 illustrates a cross sectional view of the torque tube apparatus, for describing the effect obtained by an access opening formed downward in a vertical direction.
Figure 9:
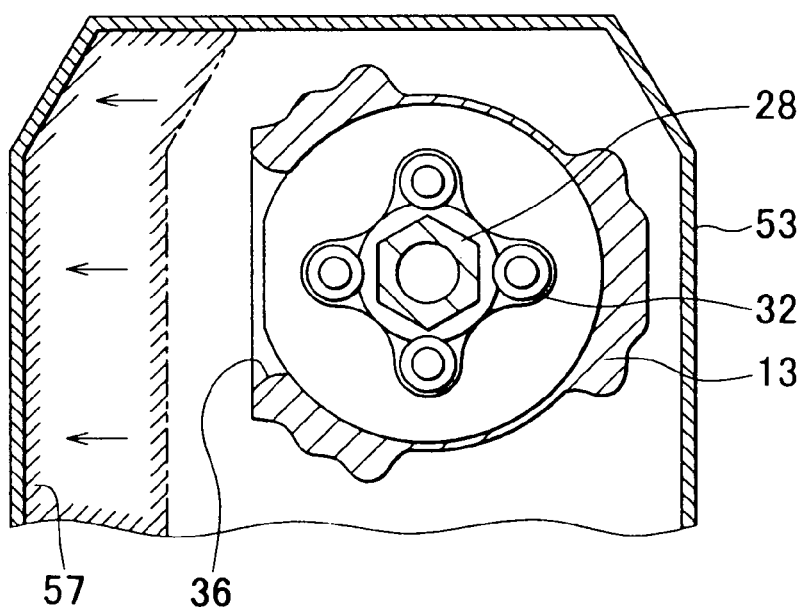
FIG. 9 illustrates a cross sectional view of the torque tube apparatus having an access opening formed in the horizontal direction, FIG. 9 being used for comparison with the torque tube apparatus in FIG. 8.

Also, in the first embodiment, the access opening 36 used during maintenance on the powertrain 1 faces downward in the vertical direction. FIG. 8 illustrates a cross sectional view of the torque tube apparatus, for describing an effect obtained by the access opening formed downward in the vertical direction. FIG. 9 illustrates a cross sectional view of the torque tube apparatus having an access opening formed in the horizontal direction. Each of FIGS. 8 and 9 illustrates the same region shown in the cross sectional view in FIG. 5.

Generally, maintenance on the powertrain 1 is performed from the bottom surface side of the vehicle, as shown in FIG. 8. Accordingly, maintenance on the powertrain 1 can be performed more easily by providing the access opening 36 that faces downward in the vertical direction. Also, since a region 56 shown in FIG. 8 can be obtained, as the working space, at the bottom portion of the vehicle, the width of a body 53 that covers the torque tube 12 need not be increased. In contrast to this, when the access opening 36 is provided so as to open in the horizontal direction as shown in FIG. 9, a region 57 needs to be obtained as the working space. Accordingly, the width of the body 53 needs to be increased. Therefore, with the torque tube apparatus according to the first embodiment, the limited space in the vehicle can be effectively utilized.

In the first embodiment, the torque tube shaft 18 and the sleeve 28 are loosely splined to each other, and the clutch shaft 25 and the sleeve 28 are connected to each other via the flange 40. Providing the sleeve 28 in the powertrain 1 produces the following effect.

Figure 10:
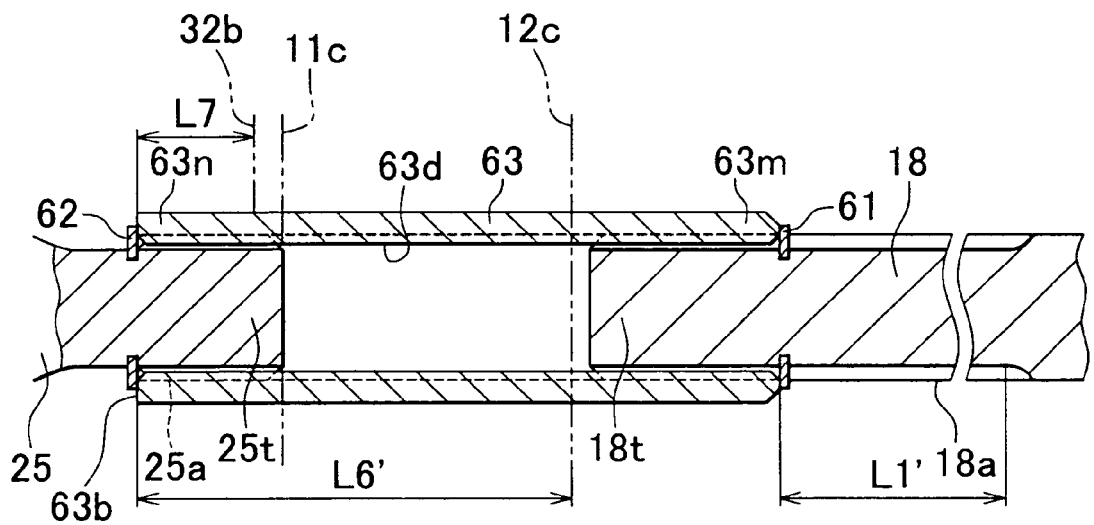
FIG. 10 illustrates a cross sectional view of the portion at which the torque tube shaft and the clutch shaft are connected to each other when the torque tube apparatus is provided with a sleeve whose both ends are splined to the shafts, FIG. 10 being used for comparison.

FIG. 10 illustrates a cross sectional view when the torque tube apparatus is provided with a sleeve whose both ends are splined to the shafts, FIG. 10 being used for comparison. FIG. 10 shows a sleeve 63 which has a cylindrical shape, and which has a spline in an inner surface 63d. A first end 63m of the sleeve 63 is loosely splined to the end portion 18t of the torque tube shaft 18, and a second end 63n of the sleeve 63 is loosely splined to the end portion 25t of the clutch shaft 25. In FIG. 10, the positions of the end surfaces 12c, 11c and 32b are indicated by chain double-dashed lines 12c, 11c, and 32b, respectively.

Even in the case shown in FIG. 10, the sleeve 63 needs to be moved to a position at which an end surface 63b of the sleeve 63 does not protrude from the end surface 12c of the torque tube 12. Accordingly, if the distance for which the sleeve 63 can slide is L1', and the distance from the end surface 12c to the end surface 63b is L6', the distance L1' needs to be longer than the distance L6' (L1'>L6'). However, in the case shown in FIG. 10, the sleeve 63 and the clutch shaft 25 are splined to each other. Accordingly, the distance L6' in FIG. 10 is longer than the distance L6 in FIG. 2 by a distance L7 between the end surface 32b and the end surface 63b. Namely, by connecting the clutch shaft 25 and the sleeve 28 to each other via the flange, the distance for which the sleeve 28 slides in the torque tube apparatus according to the first embodiment is shortened in comparison to that in the torque tube apparatus, shown in FIG. 10, where both ends are splined to the shafts.

In the torque tube apparatus shown in FIG. 10, since the sleeve 63 is slid, both the first end 63m and the second end 63n are loosely splined to the shafts. In this case, however, backlash and vibration during rotation of the sleeve 63 may increase. In contrast to this, in the torque tube apparatus according to the first embodiment, since the second end 28n is fixed to the flange 40 tightly splined to the clutch shaft 25, the sleeve 28 can be stably rotated.

In the torque tube apparatus shown in FIG. 10, a snap ring 61 is provided at one end of the sleeve 63, and a snap ring 62 is provided at the other end of the sleeve 63 to restrict movement of the sleeve 63 in the axial direction. Since the snap rings 61 and 62 need to be removed when maintenance is performed, the number of steps increases, reducing the efficiency in performing maintenance. Also, because the positions at which the snap rings 61 and 62 are provided are far apart from each other in the axial direction, it would be necessary to either increase the number of the access openings, or enlarge the access the access opening. In contrast to this, in the torque tube apparatus according to the first embodiment, only the space where the sleeve 28 and the flange 40 are fastened to each other needs to be obtained. Accordingly, the area of the access opening 36 can be made small, and, in addition, the number of the openings can be reduced. As a result, the strength of the intermediate case 13 can be improved, and the intermediate case 13 can be produced more easily.

The torque tube apparatus according to the first embodiment of the invention includes the transaxle 10 as a first power transmission device and the clutch unit 20 as a second power transmission device that are provided at a given distance from each other; the tube member 14 that connects the transaxle 10 and the clutch unit 20 to each other; the transaxle-side shaft 22 that extends from the transaxle 10 and that has the end portion 18t as a first end portion at the end on the extension side; the clutch shaft 25 that extends from the clutch unit 20, and that serves as the second shaft having, at the end on the extension side, the end portion 25t as a second end portion provided at a given distance from the end portion 18t; and the sleeve 28 as an intermediate shaft having the first end 28m and the second end 28n.

The first end 28m is connected to the end portion 18t, and can slide with respect to the transaxle-side shaft 22 in the axial direction. The second end 28n is connected to the end portion 25t, and can be removed from the clutch shaft 25. The tube member 14 has the intermediate case 13 as an intermediate shaft case that surrounds the sleeve 28, and that can be removed from the powertrain 1. The second end 28n is separated from the clutch shaft 25, and the first end 28m is slid with respect to the transaxle-side shaft 22 toward the transaxle 10, whereby the intermediate case 13 can be removed.

With the thus configured torque tube apparatus according to the first embodiment of the invention, the intermediate case 13 can be removed by terminating the connection between the torque tube shaft 18 and the clutch shaft 15 provided by the sleeve 28. Therefore, although the structure including the torque tube is employed in the powertrain 1 and there is no extendable/telescopic component such as a propeller shaft, a space where the transaxle 10 and the clutch unit 20 are slid can be obtained. As a result, for example, when expendable components such as a clutch are replaced with a new one, only the clutch unit 20, not the entire powertrain, needs to be removed.

In the first embodiment, the sleeve 28 is provided so as to be slidable with respect to the torque tube shaft 18. Accordingly, the sleeve 28 can be retracted to a position at which the sleeve 28 does not contact the removed intermediate case 13 by just loosening the bolts 38 which provides connection between the flange 40 and the sleeve 28. Therefore, maintenance can be performed easily and promptly. For these reasons, with the torque tube apparatus according to the first embodiment, maintenance on the powertrain mounted in the vehicle can be performed more easily.

Figure 11:
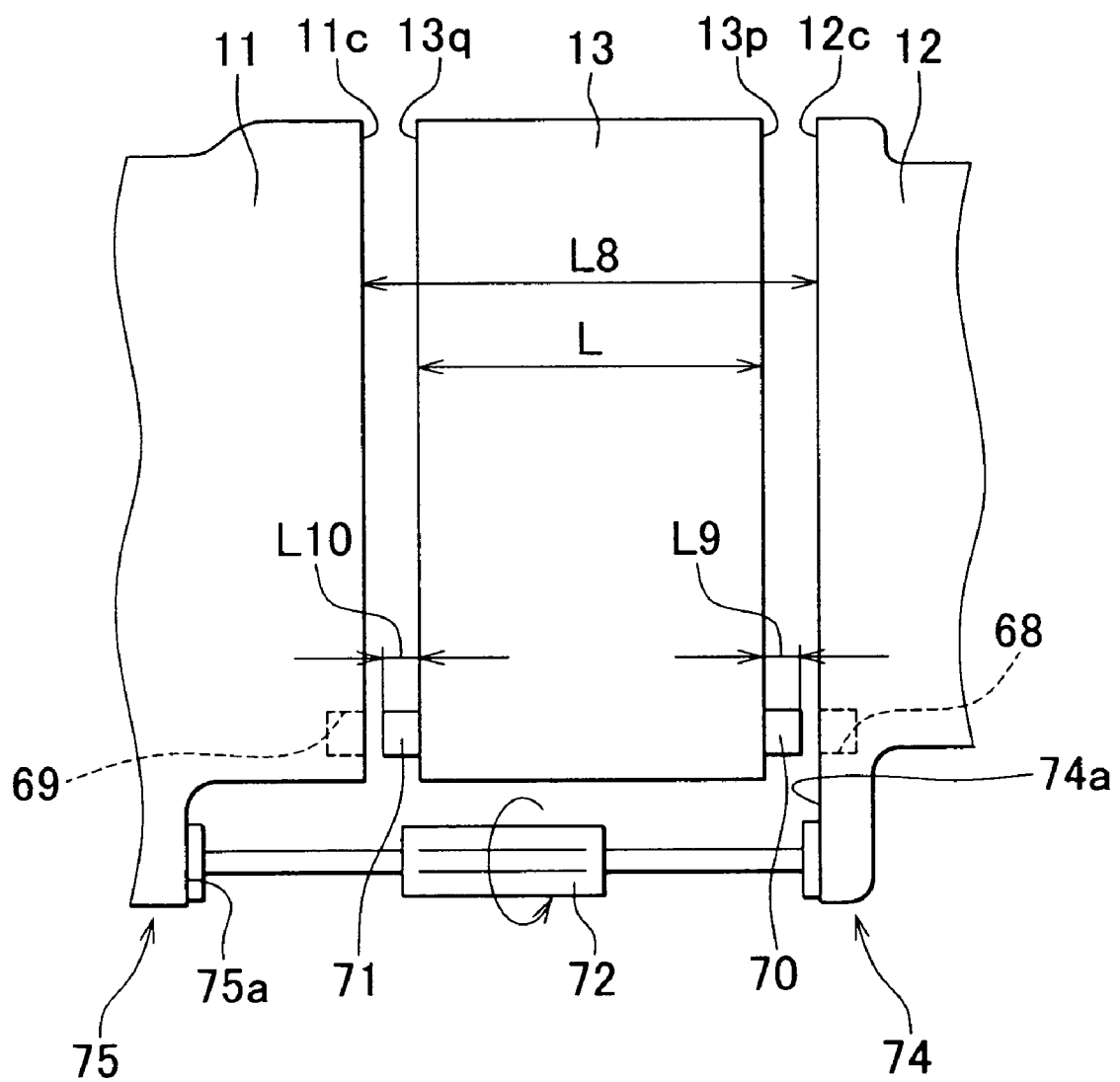
FIG. 11 illustrates a side view of a torque tube apparatus according to a second embodiment of the invention.

Next, a second embodiment of the invention will be described in detail. FIG. 11 illustrates a side view of a torque tube apparatus according to the second embodiment of the invention. Basically, the torque tube apparatus according to the second embodiment has a structure similar to that of the torque tube apparatus according to the first embodiment. Note that, the same structure as that in the first embodiment will not be described.

As shown in FIG. 11, in the torque tube apparatus according to the second embodiment, the intermediate case 13 is provided with a knock-pin 70 protruding from the end surface 13p and a knock pin 71 protruding from the end surface 13q. A hole 68 into which the knock-pin 70 is fitted is formed in the end surface 12 of the torque tube 12, and a hole 69 into which the knock-pin 71 is fitted is formed in the end surface 11c of the front-side case 11.

The torque tube 12 is provided with a jig supporting portion 74 having a supporting surface 74a, and the front-side case 11 is provided with a jig supporting portion 75 having a supporting surface 75a that faces the supporting surface 74a. A jig 72 for forming a clearance between the intermediate case 13 and each of the toque tube 12 and the front-side case 11 is provided between the supporting surface 74a and the supporting surface 75a.

With such a structure, to remove the intermediate case 13, the distance between the end surface 11c and the end surface 12c is increased by using the jig 72 until the knock-pins 70 and 72 are removed from the holes 68 and 69, respectively. More specifically, if the length of protrusion of the knock-pin 70 from the end surface 13p is L9, and the length of protrusion of the knock-pin 71 from the end surface 13q is L10, the distance between the end surface 11c and the end surface 12c needs to be increased to a distance L8 that is longer than the sum of the length L, the distance L9, and the distance L10 (L8>L+L9+L10).

The thus configured torque tube apparatus according to the second embodiment of the invention produces the same effect as that disclosed in the first embodiment. In addition, the intermediate case 13 can be accurately positioned with a simple structure, by providing the knock-pins 70 and 71 to the intermediate case 13. Also, the jig supporting portions 74 and 75 for supporting the jig 72 are provided in the torque tube 12 and the front-side case 11, respectively. Therefore, the engine mounting rubber can be easily deflected to form a clearance between the intermediate case 13 and each of the torque tube 12 and the front-side case 11. As a result, the efficiency in performing maintenance can be further improved.

Figure 12:
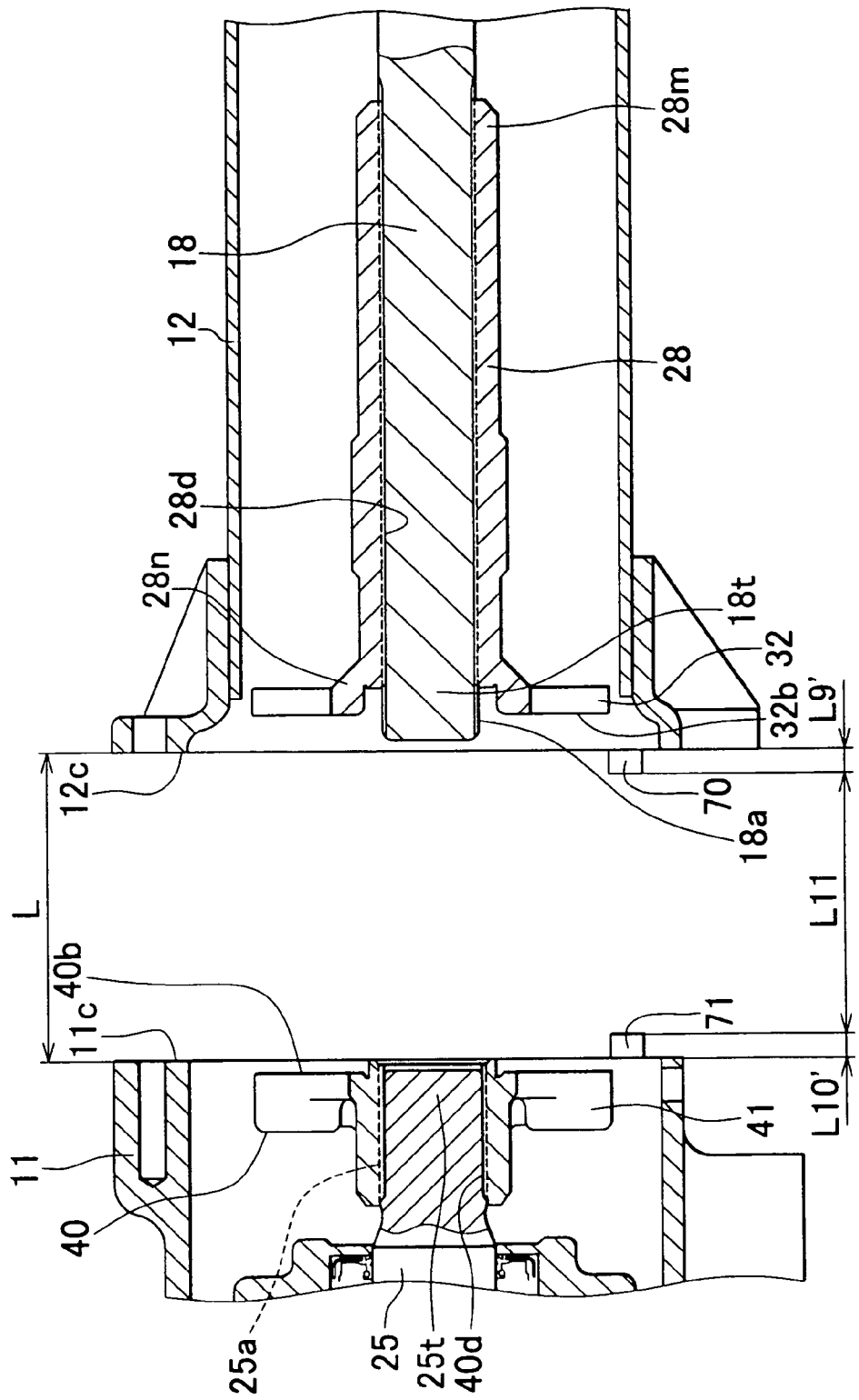
FIG. 12 illustrates the torque tube apparatus in which knock-pins are provided to a torque tube and a front side case, FIG. 12 being used for comparison.

Also, in the second embodiment, the knock-pins 70 and 71 are provided to the intermediate case 13, not to the torque tube 12 and the front-side case 11. This produces the following effect. FIG. 12 illustrates the torque tube apparatus in which knock-pins are provided to the torque tube and the front side case, FIG. 12 being used for comparison.

As shown in FIG. 12, when the knock-pins 70 and 71 are provided to the torque tube 12 and the front-side case 11, respectively, the knock pin 70 protruding from the end surface 12c and the knock-pin 71 protruding from the end surface 11c are left in the space for maintenance that is formed after the intermediate case 13 is removed. When the length of protrusion of the knock-pin 70 from the end surface 12c is L9', and the length of protrusion of the knock pin 71 from the end surface 11c is L10', a distance L11 for which the clutch unit 20 and the like can slide by using the space for maintenance is equal to the value obtained by subtracting the sum of length L9 and the length L10 from the length L (L11=L−(L9+L10)). Accordingly, in the torque tube apparatus shown in FIG. 12, the distance for which the clutch unit 20 and the like can slide is reduced by the lengths of the knock pins 70 and 71. In contrast to this, in the second embodiment, the distance for which the clutch unit 20 and the like can slide, which is equal to the length L of the intermediate case 13, can be obtained. Accordingly, the length L can be reduced, and the intermediate case 13 can be made lighter and smaller. As a result, the efficiency in performing maintenance can be further improved.

Next, a third embodiment of the invention will be described. FIG. 13 illustrates a cross sectional view of a torque tube apparatus according to the third embodiment of the invention. Basically, the torque tube apparatus according to the third embodiment has a structure similar to that of the torque tube apparatus according to the first embodiment. Note that, the same structure as that in the first embodiment will not be described.

As shown in FIG. 13, in the third embodiment, another flange 40 is further provided at the end portion 18t of the torque tube shaft 18 in substantially the same manner in which the flange 40 is provided at the end portion 25t of the clutch shaft 25. However, the clutch shaft 25 and the flange 40 are tightly splined to each other, but the torque tube shaft 18 and the flange 40 are loosely splined to each other.

A connecting shaft 81 having a first end 81m and a second end 81n is provided between the end portion 18t and the end portion 25t. Each of the first end portion 81m and the second end portion 81n is provided with the collar portion 32 protruding in the radial direction is provided in. The collar portion 41 and the collar portion 32 are fastened to each other with the bolts 38 on each of the first end 81m side and the second end 81n side. Thus, the torque tube shaft 18 and the clutch shaft 25 are connected to each other by the connecting shaft 81.

When maintenance on the powertrain is performed, all the bolts 38 fastening the connecting shaft 81 and the flange 40 to each other are loosened and removed in the same manner as that disclosed in the first embodiment. Next, the flange 40 is slid with respect to the end portion 18t of the torque tube shaft 18, and retracted to a position at which the end surface 40b does not protrude from the end surface 12c. Finally, the intermediate case 13 together with the connecting shaft 81 is removed from the position between the front-side case 11 and the torque tube 12. A length L12 of the connecting shaft 81 is set to be shorter than the length L of the intermediate case 13 (L>L12) to make it possible to remove the connecting shaft 81.

The torque tube apparatus according to the third embodiment of the invention includes the transaxle 10 and the clutch unit 20 that are provided at a given distance from each other; the tube member 14 that connects the transaxle 10 and the clutch unit 20 to each other; the transaxle-side shaft 22 that extends from the transaxle 10 and that has the end portion 18t on the extension side; the clutch shaft 25 that extends from the clutch unit 20 and that has the end portion 25t positioned at a given distance from the end portion 18t; and the connecting shaft 81 that is connected to the end portion 18t and the end portion 25t, and that serves as an intermediate shaft that can be separated from the transaxle-side shaft 22 and the clutch shaft 25.

The tube member 14 includes the toque tube 12 as a main body case extending from at least one of the transaxle 10 and the clutch unit 20; and the intermediate case 13 that surrounds the connecting shaft 81, and that can be removed from the torque tube 12. The intermediate case 13 can be removed from the torque tube 12 by separating the connecting shaft 81 from the transaxle-side shaft 22 and the clutch shaft 25.

With the thus configured torque tube apparatus, as in the case of the first embodiment, when maintenance on the transaxle 10 and the clutch unit 20 is performed, only the components targeted for maintenance needs to be removed from the vehicle instead of removing the entire powertrain. In addition, when maintenance is performed, only the intermediate case 13 is removed with the torque tube 12 left on the powertrain side. Accordingly, the efficiency in performing maintenance can be improved, as compared to the case where the entire tube member 14 needs to be removed.

Note that, a torque tube apparatus formed by appropriately combining the structures of the torque tube apparatuses according to the first to third embodiments may be employed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A torque tube apparatus, comprising:
a first power transmission device;
a second power transmission device that is provided at a given distance from the first transmission device;
a tube member that connects the first power transmission device and the second power transmission device to each other;
a first shaft that extends from the first power transmission device, having a first end portion at an end on an extension side;
a second shaft that extends from the second power transmission device, having a second end portion at an end on an extension side, the second end portion being positioned at a given distance from the first end portion; and
an intermediate shaft having a first end that is connected to the first end portion, and wherein the first end is slidable with respect to the first shaft in an axial direction, and a second end that is connected to the second end portion, and wherein the second end is removable from the second shaft,
wherein the tube member has a removable intermediate shaft case that surrounds the intermediate shaft,
wherein the intermediate shaft case can be removed by removing the second end from the second shaft, and sliding the first end with respect to the first shaft toward the first power transmission device,
wherein the tube member further includes a main body case which extends from at least one of the first power transmission device and the second power transmission device, and to which the intermediate shaft case is removably connected, and
wherein the intermediate shaft case can be removed from the main body case by separating the second end from the second shaft and sliding the first end with respect to the first shaft toward the first power transmission device,
wherein the tube member further includes a first main body case that has an attachment surface that the intermediate shaft case contacts, and that extends from the first power transmission device, the first shaft and the second shaft extend in a predetermined direction, and
wherein the intermediate shaft slides with respect to the first shaft, to a position at which the intermediate shaft does not protrude from the attachment surface, and a distance between the first end portion and the second end portion is longer than a length of the intermediate shaft case in the predetermined direction.

2. The torque tube apparatus according to claim 1, wherein the first shaft and the second shaft extend in a predetermined direction,
the main body case has an attachment surface that the intermediate shaft case contacts, and the intermediate shaft case has a contacting surface that the main body case contacts, and
a positioning pin protruding in the predetermined direction is provided on one of the attachment surface and the contacting surface, and a hole into which the positioning pin is inserted is formed in the other of the attachment surface and the contacting surface.

3. The torque tube apparatus according to claim 2, wherein the hole is formed in the attachment surface, and the positioning pin is provided on the contacting surface.

4. The torque tube apparatus according to claim 2, wherein the main body case includes jig attachment portion at which jig used to form a clearance between the attachment surface and the contacting surface is provided.

5. The torque tube apparatus according to claim 1, wherein the first end is splined to a spline formed in the first end portion, and the second end contacts and is fixed to an end surface of a flange member provided at the second end portion.

6. The torque tube apparatus according to claim 1, wherein the first power transmission device is a transaxle and the second power transmission device is a clutch unit, and the intermediate shaft is provided at a position closer to the second power transmission device than to the first power transmission device.

7. The torque tube apparatus according to claim 1, wherein the first shaft and the second shaft extend in a predetermined direction,
the first shaft and the second shaft are each fitted, respectively, to the first power transmission device and the second power transmission device and each of the first shaft and the second shaft may be fitted to the respective power transmission devices independently of the other shaft, and
the intermediate shaft case is longer than at least one of a distance for which the first shaft moves with respect to the first power transmission device and a distance for which the second shaft moves with respect to the second power transmission device.

8. The torque tube apparatus according to claim 1, wherein an access opening that faces downward in a vertical direction is formed in the intermediate shaft case.

9. The torque tube apparatus according to claim 1, wherein the first shaft and the second shaft extend in a predetermined direction, and
the torque tube apparatus further includes a movement restricting member that is provided between the first end portion and the second end portion, and that restricts movement of the first shaft and the second shaft in the predetermined direction.

10. The torque tube apparatus according to claim 1, wherein the movement restricting member is splined to a spline formed in the intermediate shaft.

11. A torque tube apparatus, comprising:
a first power transmission device;
a second power transmission device that is provided at a given distance from the first transmission device;
a tube member that connects the first power transmission device and the second power transmission device to each other;
a first shaft that extends from the first power transmission device, having a first end portion at an end on an extension side;
a second shaft that extends from the second power transmission device, having a second end portion at an end on an extension side, the second end portion being positioned at a given distance from the first end portion; and
an intermediate shaft that is connected to the first end portion and the second end portion, and that is removable from the first shaft and the second shaft,
wherein
the tube member includes a main body case that extends from at least one of the first power transmission device and the second power transmission device, and an intermediate shaft case that surrounds the intermediate shaft and that is removable from the main body case, and
the intermediate shaft case can be removed from the main body case by separating the intermediate shaft from the first shaft and the second shaft,
the first shaft and the second shaft extend in a predetermined direction,
the first shaft and the second shaft are each fitted, respectively, to the first power transmission device and the second power transmission device and each of the first shaft and the second shaft may be fitted to the respective power transmission devices independently of the other shaft, and
the intermediate shaft case is longer than at least one of a distance for which the first shaft moves with respect to the first power transmission device and a distance for which the second shaft moves with respect to the second power transmission device.

12. The torque tube apparatus according to claim 11, wherein
the first shaft and the second shaft extend in a predetermined direction, and
the intermediate shaft case is longer than the intermediate shaft in the predetermined direction.

13. The torque tube apparatus according to claim 11, wherein
the first shaft and the second shaft extend in a predetermined direction, and
the main body case has an attachment surface that the intermediate shaft case contacts and the intermediate shaft case has a contacting surface that the main body case contacts, and
a positioning pin protruding in the predetermined direction is provided on one of the attachment surface and the contacting surface, and a hole into which the positioning pin is inserted is formed in the other of the attachment surface and the contacting surface.

14. The torque tube apparatus according to claim 13, wherein
the hole is formed in the attachment surface, and the positioning pin is provided on the contacting surface.

15. The torque tube apparatus according to claim 13, wherein
the main body case includes jig attachment portion at which a jig used to form a clearance between the attachment surface and the contacting surface is provided.

16. The torque tube apparatus according to claim 11, wherein
the first power transmission device is a transaxle and the second power transmission device is a clutch unit, and the intermediate shaft is provided at a position closer to the second power transmission device than to the first power transmission device.

17. The torque tube apparatus according to claim 11, wherein
an access opening that faces downward in a vertical direction is formed in the intermediate shaft case.

18. The torque tube apparatus according to claim 11, wherein
the first shaft and the second shaft extend in a predetermined direction, and
the torque tube apparatus further includes a movement restricting member that is provided between the first end portion and the second end portion, and that restricts movement of the first shaft and the second shaft in the predetermined direction.

19. The torque tube apparatus according to claim 18, wherein
the movement restricting member is splined to a spline formed in the intermediate shaft.

* * * * *